(12) United States Patent
Loksh et al.

(10) Patent No.: US 7,676,785 B2
(45) Date of Patent: Mar. 9, 2010

(54) HOSTED APPLICATION AS A DESIGNER IN AN INTEGRATED DEVELOPMENT ENVIRONMENT

(75) Inventors: Svetlana Loksh, Bellevue, WA (US); Thomas E. Quinn, Jr., Kirkland, WA (US); Reza Chitsaz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 10/779,298

(22) Filed: Feb. 13, 2004

(65) Prior Publication Data

US 2005/0183059 A1 Aug. 18, 2005

(51) Int. Cl.
G06F 9/44 (2006.01)

(52) U.S. Cl. .................. 717/102; 717/105; 717/113; 717/121

(58) Field of Classification Search .................. 235/376; 463/16; 705/1; 707/100–104; 714/1, 35; 715/35, 763–765, 826, 507; 717/100–105, 717/178, 113
See application file for complete search history.

(56) References Cited

U.S. PATENT DOCUMENTS

| | | | |
|---|---|---|---|
| 5,862,379 A | 1/1999 | Rubin et al. | |
| 5,950,000 A * | 9/1999 | O'Leary et al. | 717/105 |
| 5,956,036 A | 9/1999 | Glaser et al. | |
| 6,434,740 B1 | 8/2002 | Monday et al. | |
| 6,584,480 B1 | 6/2003 | Ferrel et al. | |
| 6,675,228 B1 | 1/2004 | Bahrs et al. | |
| 6,944,829 B2 * | 9/2005 | Dando | 715/798 |
| 7,020,697 B1 * | 3/2006 | Goodman et al. | 709/223 |
| 7,289,964 B1 * | 10/2007 | Bowman-Amuah | 705/1 |
| 2002/0070977 A1 * | 6/2002 | Morcos et al. | 345/810 |
| 2003/0172076 A1 * | 9/2003 | Arnold et al. | 707/100 |

OTHER PUBLICATIONS

"Plugging-in visualization: experiences integrating a visualization tool with Eclipse", Lintern et al., Jun. 2003, pp. 47-56. Online retrieved at <http://delivery.acm.org/10.1145/780000/774840/p47-lintern.pdf>.*

"Facilitating the development of representations in hypertext with IDE", Jordan et al., Nov. 1989, pp. 93-104.Online retrieved at <http://delivery.acm.org/10.1145/80000/74232/p93-jordan.pdf>.*

(Continued)

Primary Examiner—Tuan Q Dam
Assistant Examiner—Thuy Dao
(74) Attorney, Agent, or Firm—Workman Nydegger

(57) ABSTRACT

Architecture that integrates an unmanaged application as a hosted application into a design environment in a coherent yet usable manner such that the developer can use the hosted application's native functionality yet leverage rich productivity features provided by the IDE. The IDE includes a hosting component that comprises an application adaptor for providing an interface from the unmanaged application to the IDE. The IDE further includes a designer framework that provides user access to designer capabilities of the IDE. The host adaptor interfaces to the designer framework either directly and/or through an integration interface. Thus, the developer/user can then access the native functionality of the unmanaged application as well as the IDE functionality. This provides rich integration between the development environment and the hosted application, the end result of which is the designer interacting with the IDE.

23 Claims, 7 Drawing Sheets

OTHER PUBLICATIONS

"Building Collaboration into IDEs", Cheng et al., Dec. 2003, pp. 40-50. Online retrieved at <http://delivery.acm.org/10.1145/970000/966803/cheng.pdf>.*

S.P. Reiss. The Desert Environment. ACM Transactions on Software Engineering, vol. 8 Issue 4, pp. 297-342, 1999.

C. Luer and D.S. Rosenblum. WREN—an Environment for Component-based Development. Proceedings of 8th European Software Engineering Conference, pp. 207-217, 2001.

G. Milasinovic. European Search Report. Munich, Jul. 15, 2005. 3 pages.

Kraig Brockschmidt. OLE Integration Technologies: A Technical Overview. Oct. 1994. 17 pages.

Kemp Brown. Visual Studio 6.0 Extensibility Fundamentals. Jan. 1999. 9 pages.

Brian A. Randall. Visual Studio Tools for the Microsoft Office System. Apr. 2003. 13 pages.

John Robbins. Extending the Visual Studio .NET IDE. Jan. 2002. 6 pages.

* cited by examiner

HOSTED APPLICATION AS A DESIGNER IN AN INTEGRATED DEVELOPMENT ENVIRONMENT

TECHNICAL FIELD

This invention is related to a software development environment, and more specifically to architecture that facilitates bringing an unmanaged application into the environment as a designer.

BACKGROUND OF THE INVENTION

Software integrated development environments (IDEs) heretofore are not capable of integrating the functionality of an unmanaged hosted application into the development workspace. Thus, writing rich designers is normally a very complicated and time-consuming task that must consider very tight integration with the hosted applications.

What is needed is architecture that integrates the unmanaged application into the design environment in a coherent yet usable manner such that the developer can use the hosted application's native functionality yet leverage rich productivity features provided by the IDE.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture that integrates the unmanaged application as a hosted application into the design environment in a coherent yet usable manner such that the developer can use the hosted application's native functionality yet leverage rich productivity features provided by the IDE. In support thereof, there is provided an IDE having a hosting component that comprises an application adaptor that provides the interface from the unmanaged application to the IDE. The IDE includes a designer framework that provides user access to designer capabilities of the IDE. The host adaptor interfaces to the designer framework either directly and/or through an integration interface. Thus, the developer/user can then access the native functionality of the unmanaged application as well as the IDE functionality. This provides rich integration between the development environment and the hosted application, the result of which is the designer interacting with the IDE.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
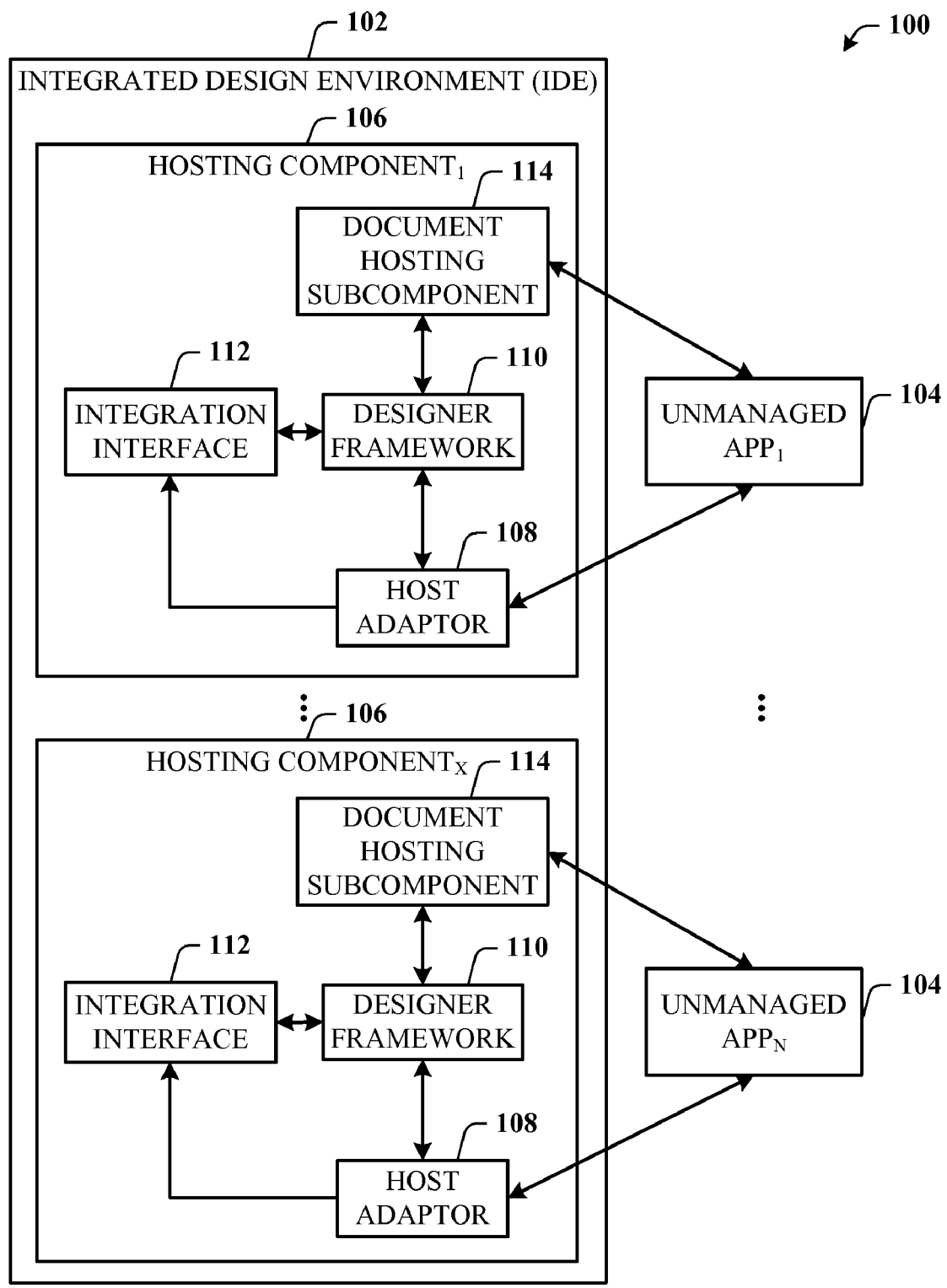
FIG. 1 illustrates a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a system 100 of the present invention. The system 100 is an enhanced Integrated Development Environment (IDE) 102 that facilitates bringing the native functionality of an unmanaged application 104 into the development environment 102. In furtherance thereof, the IDE 102 includes a hosting component 106 that interfaces to the unmanaged application 104 at least by way of a host adaptor 108. The host adaptor 108 is part of the hosting component 102 and is specific to the particular unmanaged application 104. That is, where the unmanaged application 104 is a word processor, the host adaptor provides interface capabilities specific to the word processor application. Similarly, a spreadsheet application would have its own specific host adaptor to facilitate bringing its native functionality into the IDE 102.

The hosting component 106 also includes a designer framework 110 that interfaces to the host adaptor 108, and functions as an interface between the hosting component 106 and the IDE 102. The host adaptor 108 also interfaces to the designer framework through an integration interface 112, which functions as an interface for third party applications whose native functionality can also be brought into the IDE 102, provided there is a host adaptor 108 specific to that third party application.

The hosting component 106 also includes a document hosting subcomponent 114 that interfaces to the designer framework 110 and the unmanaged application 104 to facilitate hosting an associated document of the application 104.

As indicated previously, the system 100 is capable of integrating the native functionality of a plurality of unmanaged applications (denoted as Unmanaged App$_1$ ... Unmanaged App$_N$). Thus, the IDE 102 includes a corresponding plurality of hosting components (denoted Hosting Component$_1$ ... Hosting Component$_X$). Each hosting component includes the host adaptor, designer framework, integration interface and document hosting subcomponent. Note that although these components are shown as separate entities, these entities can be combined in any manner deemed suitable to bring the native functionality of the unmanaged application into the IDE.

The system 100 is particularly suited for an OLE (Object Linking and Embedding) technology where the IDE supports OLE, and the document hosted by the document hosting subcomponent 114 is an OLE document. Thus, any application supporting OLE document interfaces can be integrated into the IDE 102. However, the present invention is not limited to such an OLE technology, and contemplates any other suitable technology for use in the IDE.

The innovation behind hosting document-based rich applications (e.g., a word processor and spreadsheet application) inside the IDE is that these applications are treated as visual designers. Hosted applications are fully functional, but take advantage of the rich functionality provided by the IDE. When hosted in the IDE, host documents can be visually designed via interaction with the different tool windows. For example, a Toolbox can be used to drag and drop controls and components onto the designer. Controls on the documents can be selected in the designer and their properties edited in a Property window. Another operation implements data binding functionality in the application via a Data Source Picker Tool window, for example.

The present invention turns a hosted application into a visual designer without diminishing any of the native functionality provided by the hosted application. This effectively turns the hosted application into a design surface that developers can drag and drop objects onto in order to rapidly create solutions and applications. Moreover, the disclosed approach provides a familiar and consistent development model developing applications in the IDE. Additionally, the enhanced IDE of the present invention keeps the number of concepts to a minimum while also minimizing the number of design paradigms.

Figure 2:
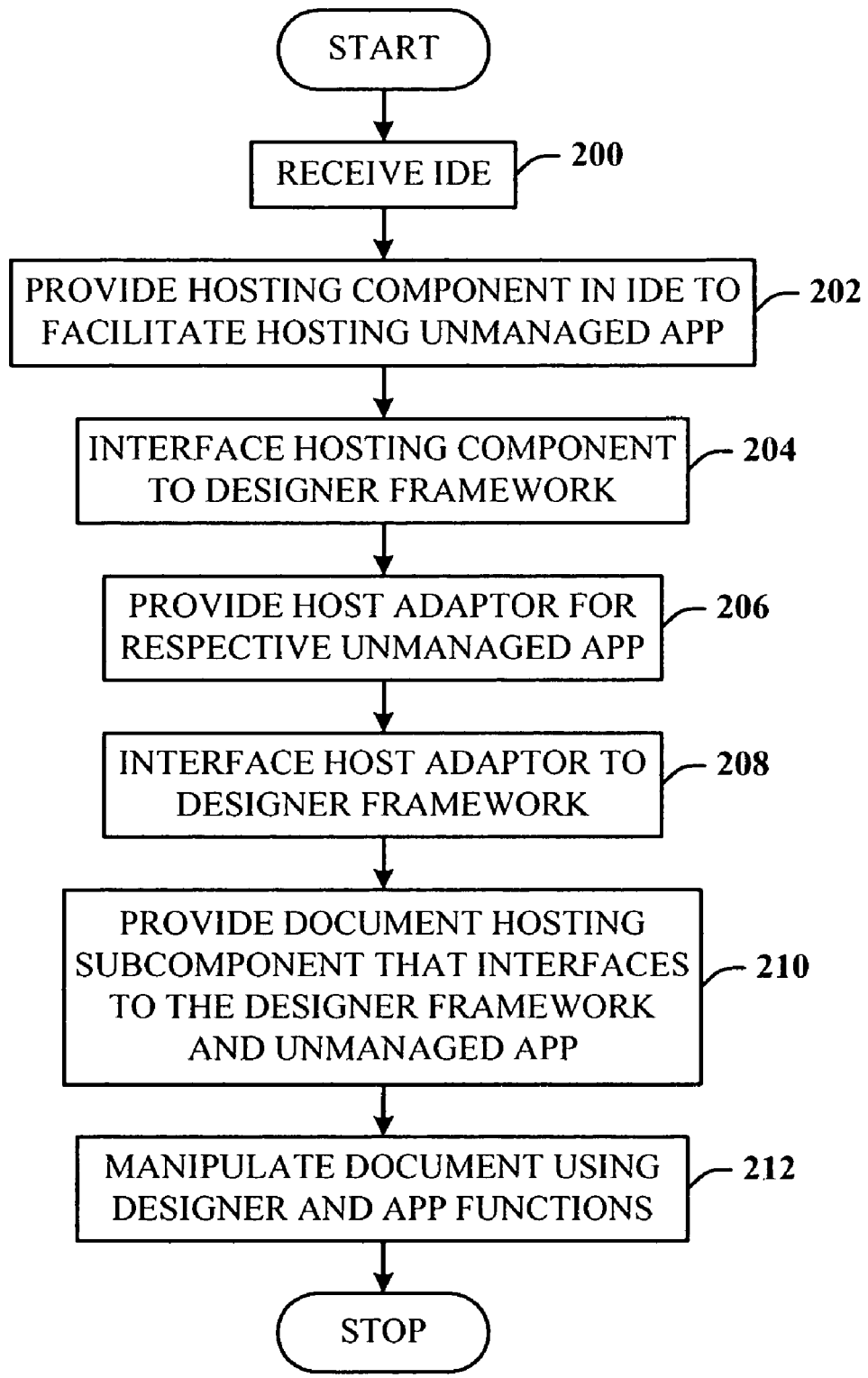
FIG. 2 illustrates a flow chart of a process for integrating native application functionality in an IDE.

Referring now to FIG. 2, there is illustrated a flow chart of a process for integrating native application functionality in an IDE. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, an IDE is provided. At 202, the hosting component is provided in the IDE to facilitate hosting the unmanaged application. At 204, the designer framework so provided and interfaced to the hosting component. At 206, the host adaptor specific to the unmanaged application is provided as part of the hosting component. At 208, the host adaptor is interfaced directly to the designer framework and indirectly through the integration interface for third party applications. At 210, the document hosting subcomponent is provided and interfaced to the designer framework and the unmanaged application. At 212, the hosted document can now be manipulated using both the designer functionality and native functionality of the unmanaged application. The process then reaches a Stop block.

Figure 3:
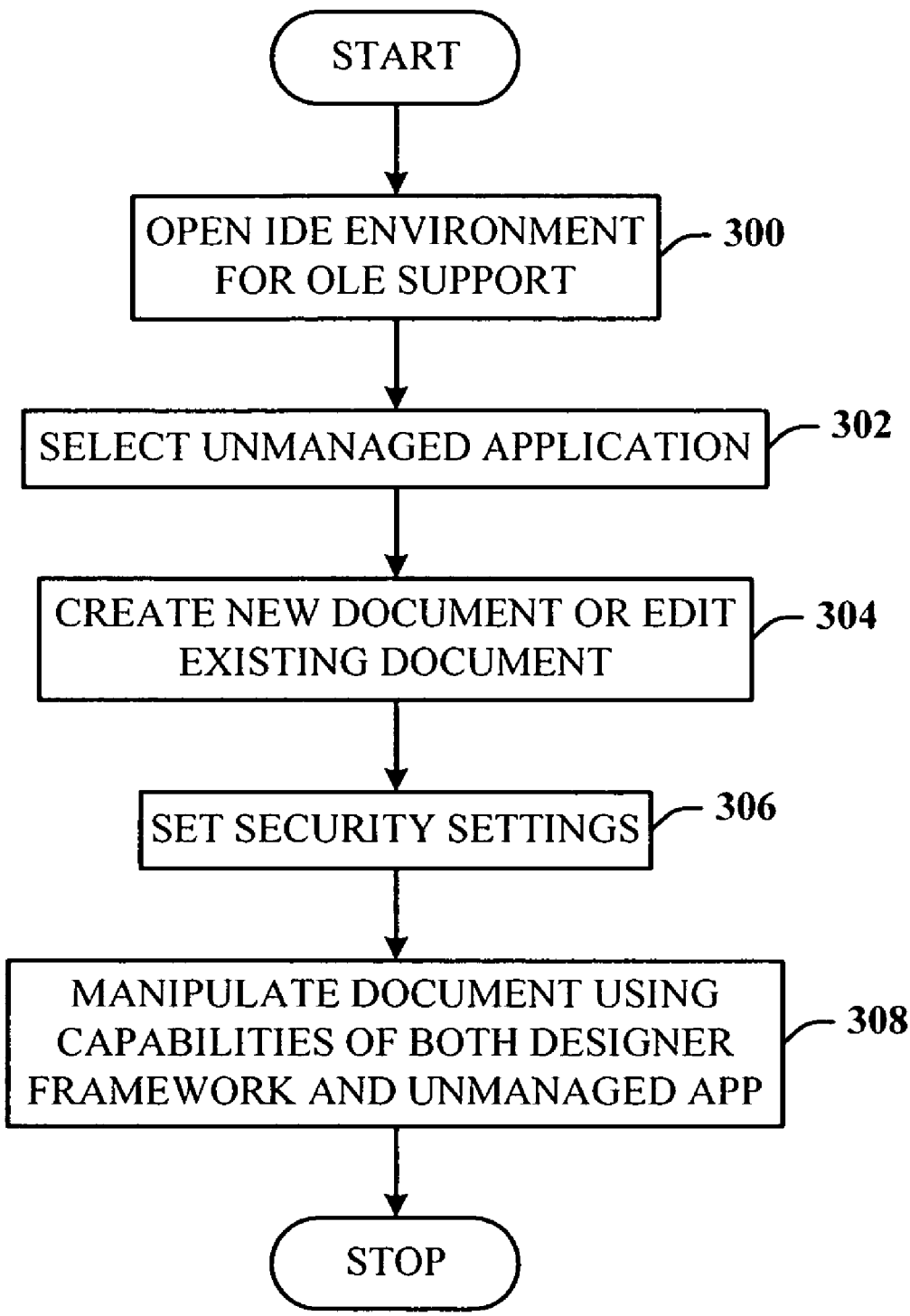
FIG. 3 illustrates a flow chart of a process for OLE document development in accordance with the present invention.

Referring now to FIG. 3, there is illustrated a flow chart of a process for OLE document development in accordance with the present invention. In this particular process implementation, the IDE environment supports OLE technology. At 300, the developer opens the IDE environment. At 302, the unmanaged application is selected. At 304, a new document is opened or an existing document is opened for editing. At 306, security settings can be set for the document to, for example, set various levels of permissions or restrictions according to where the document will be processed. At 308, the developer/user manipulates the document and/or document content using capabilities of one or both of the designer framework and native functionality of the hosted application. The process then reaches a Stop block.

Host Adaptors

When the hosted application is opened as a designer, the hosted menus will merge with the menus of the IDE. Certain menu items will be enabled and others will be disabled depending on whether the hosted application has focus or not. That is, if the IDE has focus, certain menu item will be disabled within the hosted application. Contrariwise, if the hosted application has focus, certain menu items of the IDE will be disabled. This is but only one function of the host adaptor.

Figure 4:
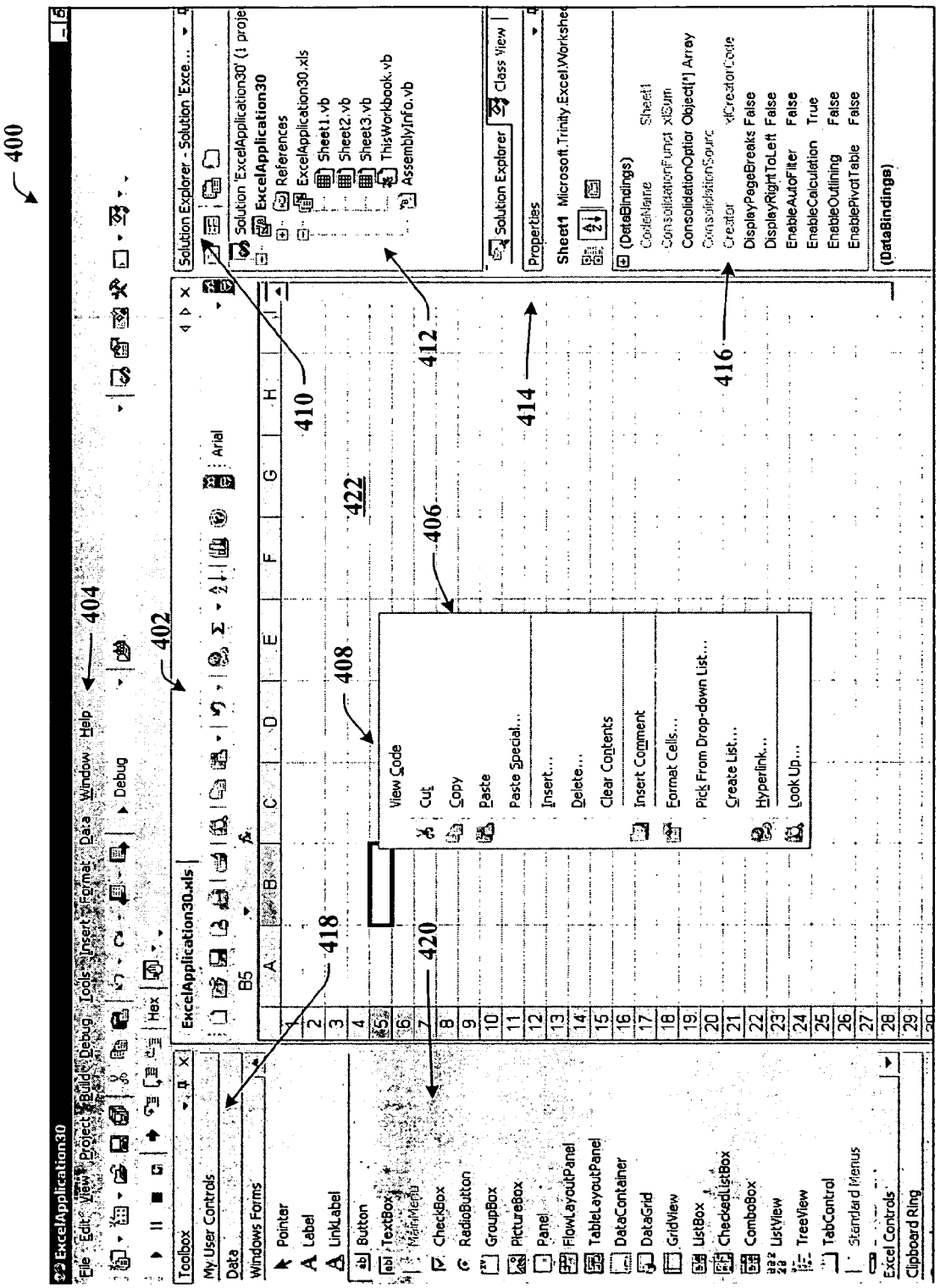
FIG. 4 is a sample window showing integrated functionally in accordance with the present invention.

Referring now to FIG. 4, there is a sample window 400 showing integrated functionally in accordance with the present invention. The window 400 is representative of a hosted spreadsheet application (e.g., related to an EXCEL-brand spreadsheet application). The window 400 shows host menus 402 merged with the IDE menus 404 of the IDE, a host context menu 406 with an additional View Code command 408, a Solution Explorer 410 showing a project structure 412, a Property window 414 showing properties 416 of the selected spreadsheet, and a Toolbox 418 with a list of controls and components 420 that can be added to a hosted document 422.

The Property window displays properties for code-behind project items and other designer project items. The hosted application pushes its properties to the Property window. The hosted application can choose to propagate properties to the Property window. The hosted application provides a list of properties (e.g., property name and property type).

Any documents that contain embedded or linked objects can be opened in the IDE. Selecting an embedded or linked object causes the menus and toolbars to change for the selected object.

If the first radio button in the Tools options is selected, the adaptor captures all accelerators and routes the accelerators to a table of shortcuts (or key mappings) in the IDE that are dynamically created. Anything not handled is passed down by the IDE table back to the hosted application for handling.

Right clicking on the designer will bring up the standard spreadsheet context menu. The additional menu command "View Code" is the first command in the context menu. Having the "View Code" command at the top of the list provides consistency with the context menus of other programs. Selecting the View Code command off a spreadsheet cell navigates the developer to the code editor for that worksheet. The cursor will be set to wherever it was set to before. By default, this means the cursor will be set to the top of the editor. Right clicking on a View Control will display the context menu for that View Control. Selecting the View Code command off a View Control navigates the developer to a code editor of the IDE and sets the cursor to wherever it was set to before.

Right clicking on a worksheet tab brings up a context menu of the spreadsheet application. This context menu contains a View Code command that if selected navigates the user to code behind the file for that spreadsheet in the IDE code editor, when selected. The cursor placing behavior in the code editor is the same with this View Code command as it is with the View Code command on the designer.

Figure 5:
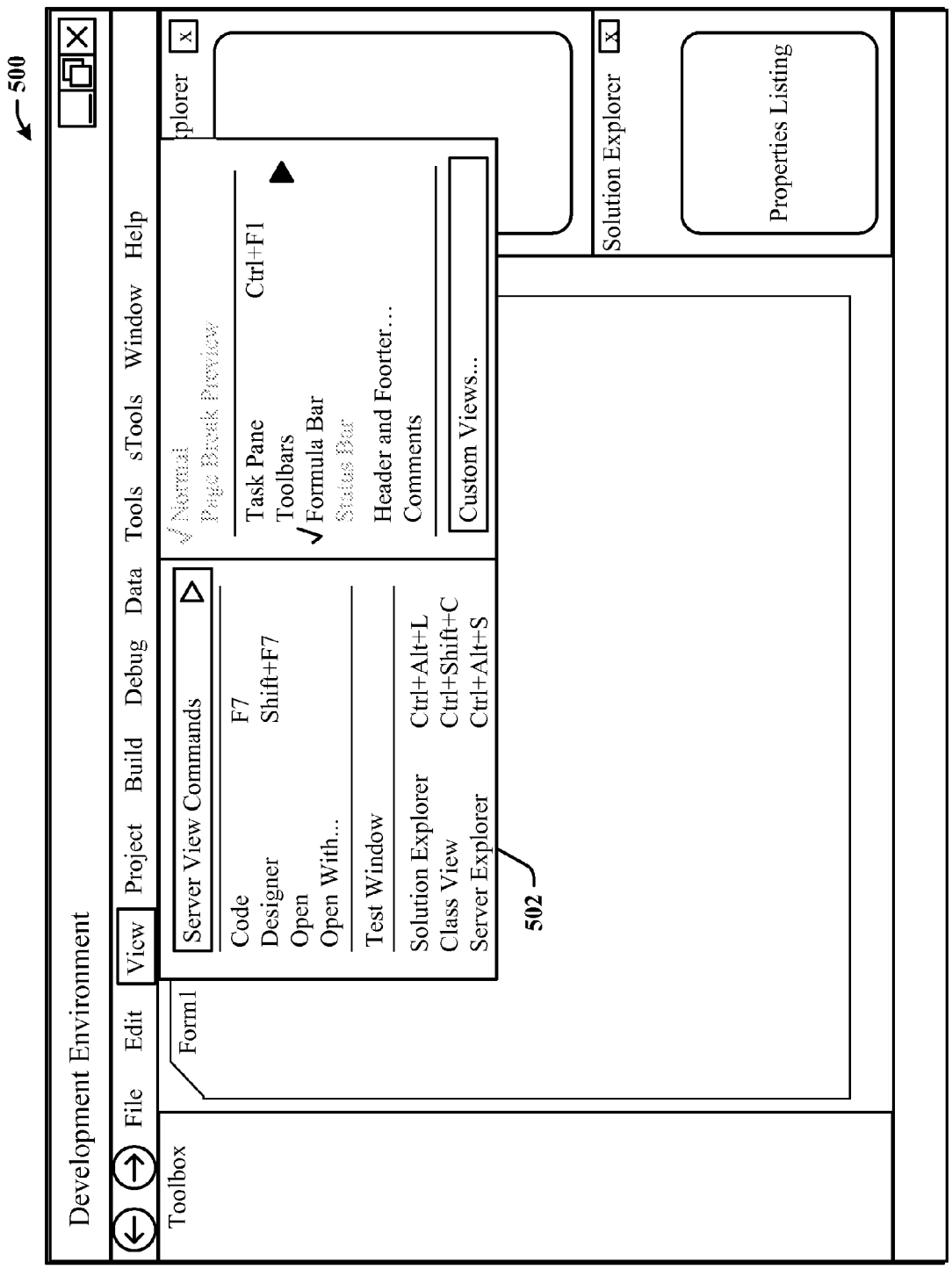
FIG. 5 illustrates a window showing an integrated and cascading menu feature of the present invention.

Referring now to FIG. 5, there is illustrated a window 500 showing an integrated and cascading menu feature 506 of the present invention. Integration of the hosted application (also known as a server application) with the IDS can result in conflicts between similarly named menu items. Here, integration of the IDE and the hosted application causes a menu conflict such that at least the View menu items are in conflict. The IDS modifies its existing View menu 502 include the hosted application menu 505 (assessable through and notated as Sever View Commands). The IDS presents to the user text that clearly identifies the location of the server View menu options within the IDE View menu 502. An expansion arrow associated with the Sever View Commands menu option facilitates accessing the cascaded server submenu items.

Example Scenario

In the IDE, the user creates a new spreadsheet project. Spreadsheet-related project items are created in the Solution Explorer and the spreadsheet workbook, and sheets are displayed in the document window, as a designer. The spreadsheet document is designed inside the IDE. The disclosed architecture merges the menus of the IDE and hosted application, and toolbars are available within the spreadsheet application of the designer, providing productivity features and the IDE features all in one environment. The spreadsheet can be edited and modified using the full fidelity of the spreadsheet application, as well as use the IDE tool windows and editors to customize the spreadsheet using managed code. From the Toolbox, the user can drag and drop a managed button onto the document. The button can be selected and its properties modified using a property grid. Customizations can be made inside an automatically generated event handler by double clicking on the button and entering Code View.

Designer Modes

The hosted application operates in a Design mode and a Runtime mode to distinguish between design actions and runtime actions within the hosted application. The set of actions the user can perform in each mode may differ from application to application, and is dependent on the hosted application regardless of whether or not in the IDE. In one implementation, the hosted application is in design time mode, and stays in design time mode when hosted in the IDE. This experience facilitates dragging controls onto the designer, selecting the control to view and edit its properties, and double clicking on the control to enter Code View. The host adaptor for an unmanaged application pushes and keeps the document in design mode when in the IDE.

Another mode is a "run" mode. When the application is running or is being debugged, it is in a "run" mode. In this mode, only native application functionality is available. Once debugging begins, the code editor becomes the active designer, and all accelerators are handled by the IDE.

Document Views

A document that is hosted in the IDE can have at least two views: a Design view, and a Code View. Generally, Design view is the design/normal view of the application. Design view is enabled for documents that support OLE Document technology. The user experience when working on these documents is substantially similar to the experience of using the original hosted application. This means that a developer can design templates/documents, create and modify documents, and use special host features such as formatting, charting, and schema mapping, for example. This behavior is achieved by leveraging OLE technologies and hosting the hosted application in the IDE.

The Design view is capable of displaying new and existing documents in formats supported by the hosted application. For instance, the designer will handle documents in binary and in XML format. This is achieved by leveraging OLE Document technologies to fully integrate the document into the IDE to enable operations such as the drag and drop of controls onto the designer, selection context, and double clicking on controls to write code. The designer is capable of displaying the entire document content, including but not limited to formatting, styles, schema maps, and embedded objects.

When in the IDE the hosted application is in "design mode". The application hosted in the IDE is fully functional, i.e., the hosted application's menus, commands, context menus, and accelerators are all available to the user when developing a solution in the IDE. At the same time, there are features and experiences that are additions to the host native functionality. As indicated herein, examples include interactions with the IDE tool windows, the capability to right click on the designer (document) and select the "Code View" command to navigate to the code behind file, select a function key (e.g., F5) to start debugging, etc. These features significantly improve the developer experience inside the IDE and aid the developer in designing applications.

There are cases when the user experience inside the hosted application can differ from the experience in the IDE. For example, if a "Tools>Macro" menu option is not available, different actions can occur when certain key combinations are exercised (e.g., if Alt+F11 is selected, a Macro environment will be loaded). Specific cases where the hosted application behavior differs from that of when it is outside of the IDE are associated with the host adaptor. The host adaptor processes these differences in behavior by turning these host features off or modifying their behavior. The purpose of doing this is to improve the developer experience, and increase the integration between the hosted application and the development environment.

Note that if an application document has multiple "subdocuments" associated with it (e.g., multiple worksheets associated with a workbook), then there will be a code view associated with each of the "subdocuments" (i.e., a code-behind file associated with each one of the worksheets). Documents that are being hosted and customized in the IDE have an associated code view.

Code View exposes a code-behind file associated with a document. The code window associated with the document presented by the designer can be activated in multiple ways. One way is by clicking the "View Code" button on the Solution Explorer or choosing menu item off the VS View menu "View Code" when either a designer or corresponding code project item is selected in the Solution Explorer. In the case when a designer is selected in the Solution Explorer, the code window corresponding to the currently active sub-document is opened. Another way is by choosing the "View Code" menu off the designer context menu (note that the cursor is not on the mapped element). Still another way is by choosing "View Code" off a Project item context menu in the Solution Explorer.

In all actions above, the code window is loaded with the cursor set at the top of the window. When code window is brought up by double clicking on a control in the designer. Code generation (i.e., handler definition) and navigation then take place. In this case, the cursor is set inside the default control event handler. The handler is generated if it does not exist already. The hosted application provides sufficient data to the IDE to know which event handler to generate. If the default event handler has already been generated, double clicking on a control will navigate the user to the code editor and place the cursor in the default event handler.

View Controls

View controls are objects that are aggregated to support data binding, and provide an event model that the developer can use to respond to events fired by the view control. In order to increase the visibility and discoverability of view controls, the controls are placed in the Toolbox as "controls" that a user can drag and drop onto the application designer. The following description is about design time tools that support discovering, creating, deleting, and working with view controls in a word processing application. However, it is to be appreciated that a spreadsheet application also has view controls associated therewith.

There is some level of support natively in the word processor application (and the spreadsheet application), for example, that can be used for creating and working with view controls. To improve the experience, additional tools support are added around view controls to increase the visibility and discoverability of this feature, as well as improve the overall developer experience of working with them. In order to provide a model that the developer will be familiar with the experience around view controls mimics working with managed controls, e.g., selection context and property window support, adding view controls from the toolbox, and double clicking on view controls to navigate to code view.

Features include, but are not limited to, regular drag and drop support of view controls from a Toolbox, default naming for view controls added via the Toolbox, selection context for view controls (e.g., selecting a view control in the designer displays the properties and in the property window, and selecting a view control in the property grid dropdown selects the view control in the designer), double clicking on a view control to navigate to code editor, default event handler generation, dynamic synchronization of code behind and view controls that are added to the designer, support for renaming view controls via a Property window, and event dropdown support for view controls in code editor. Other features can include Toolbox accessibility for view controls supporting "Enter" and "double-click" in the Toolbox to add a view control), showing Bookmarks, handling of overlapping bookmarks, function key (F1) support for view control items in the Toolbox, Toolbox accessibility (supporting Ctrl+C and Ctrl+V for adding view controls, support for deleting Bookmarks, providing a user the option to demote a view control to a regular Bookmark (to reduce clutter), tabbing between view controls, and toolbox support for Shapes. A Bookmark view control is supported for the word processor that functions to span from a single character to multiple paragraphs.

A developer can use a word processor XML Structure task pane to apply schema to a document when in the IDE. The mapping process creates XML node view control for each mapped element. Default naming of the XML node view control will be the same as the schema mapped element. To ensure uniqueness of the schema mapped view control variable an X is appended to the name if collisions occur (where X=Integer that increments as additional collisions occur).

With respect to the spreadsheet application view controls, there is provided a Named-Range control and a ListObject control. Named-Range is a mechanism to name ranges easily and maintains a name table for each spreadsheet that ensures unique naming for each named range. ListObject is an extension is a spreadsheet range that is designed to provide an enhanced data experience, including the capability to automatically grow/shrink to the dataset to which it is applied. A list objects comprises rows and columns that are exposed as ListRows and ListColumns.

Component Tray

The Component Tray facilitates a way to display or visualize non-visual components when hosting the application. There are components of development that do not have visual representation at runtime, such as data adapters and associated components. The Component Tray provides a mechanism for visually recognizing and manipulating non-visual components at design time. A developer can drag and drop, edit properties, and visualize these components. One of the ways to add a component to a view is by dragging a component from the toolbox and dropping it onto the document, setting their properties, delete them, etc. The non-visual component becomes a named class member instance of the class behind the document.

The tray is present if there are non-visual components on the document. If there are no non-visual components, then the tray completely disappears. The user inserts the first non-visual component onto a view by dropping it onto the main portion of the view, which causes the tray to open, and the non-visual component to be moved into the tray. Subsequent non-visual components can be dropped either onto the visual form or directly onto the tray.

If a visual item is dragged over the component tray, a no-drop icon is displayed and the drop performs a no-op. The tray disappears when the last non-visual component is deleted from the form and selection returns to the designer. The background of the tray is the system window background color. The components are auto-arranged to match the current width of the tray, so horizontal scrolling is never needed. A vertical scrollbar will appear in the tray, if necessary. A vertical scroll bar is added to the tray if more components are added than can be displayed in the tray frame. A horizontal scroll bar is added to the tray if a component is placed so that it appears past the component tray's left or right boundaries. Changes to the component tray do not dirty the document.

Reviewing some of the features of the disclosed architecture, the IDE Toolbox window enables drag and drop or the drawing of managed controls onto a designer surface. A Data Source window enables drag and drop of managed data components and controls onto a designer surface. The IDE Property window enables the manipulation of properties of the document and components on it. The IDE Component Tray window hosts non-visual elements dropped on documents such as data adaptors and data connectors, for example. A designer enables a developer to write managed code behind a document and components on them. A Tools/Options dialog provides specific options for various ranges of IDE functionality. A special page can exist for each of the designer hosted applications to enable flexibility for the designer to behave in various ways. The special page includes preferences that the user desires to be invoked when the unmanaged application becomes a designer in the IDE.

For document-based designers, there is an additional aspect of customizing application behavior inside the IDE in order to enhance user experience. One example of such functionality is the modified document context menus. Additionally, a "View Code" command is added to some menus to reflect that the document is "designed" and can be programmed against. Still further, a special "designer" toolbar is added for hosted applications to emphasize the designing environment.

Figure 6:
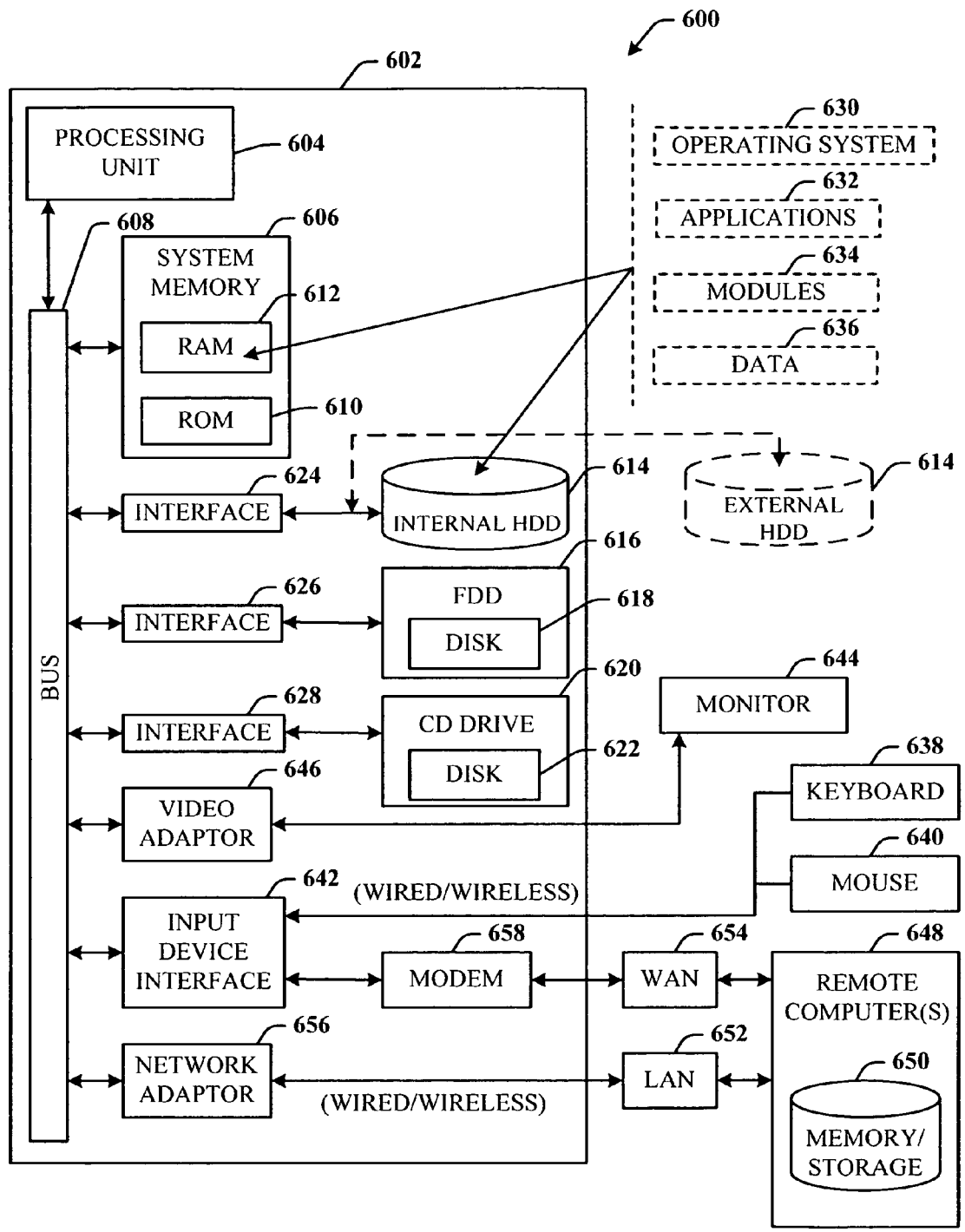
FIG. 6 illustrates a block diagram of a computer operable to execute the disclosed architecture.

Referring now to FIG. 6, there is illustrated a block diagram of a computer operable to execute the disclosed architecture. In order to provide additional context for various aspects of the present invention, FIG. 6 and the following discussion are intended to provide a brief, general description of a suitable computing environment 600 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, there is illustrated an exemplary environment 600 for implementing various aspects of the invention that includes a computer 602, the computer 602 including a processing unit 604, a system memory 606 and a system bus 608. The system bus 608 couples system components including, but not limited to, the system memory 606 to the processing unit 604. The processing unit 604 may be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read only memory (ROM) 610 and random access memory (RAM) 612. A basic input/output system (BIOS) is stored in a nonvolatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 612, including an operating system 630, one or more application programs 632, other program modules 634 and program data 636. All or portions of the operating system, applications, modules, and/or data can also be cached in the RAM 612.

It is appreciated that the present invention can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but may be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers etc.

The computer 602 may operate in a networked environment using logical connections via wired and/or wireless communications to one or more remote computers, such as a remote computer(s) 648. The remote computer(s) 648 may be a workstation, a server computer, a router, a personal computer, portable computer, microprocessor-based entertainment appliance, a peer device or other common network node, and typically includes many or all of the elements described relative to the computer 602, although, for purposes of brevity, only a memory storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656. When used in a WAN networking environment, the computer 602 can include a modem 658, or is connected to a communications server on the LAN, or has other means for establishing communications over the WAN 654, such as by way of the Internet. The modem 658, which may be internal or external and a wired or wireless device, is connected to the system bus 608 via the serial port interface 642. In a networked environment, program modules depicted relative to the computer 602, or portions thereof, may be stored in the remote memory/storage device 650. It will be appreciated that the network connections shown are exemplary and other means of establishing a communications link between the computers may be used.

The computer 602 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 7:
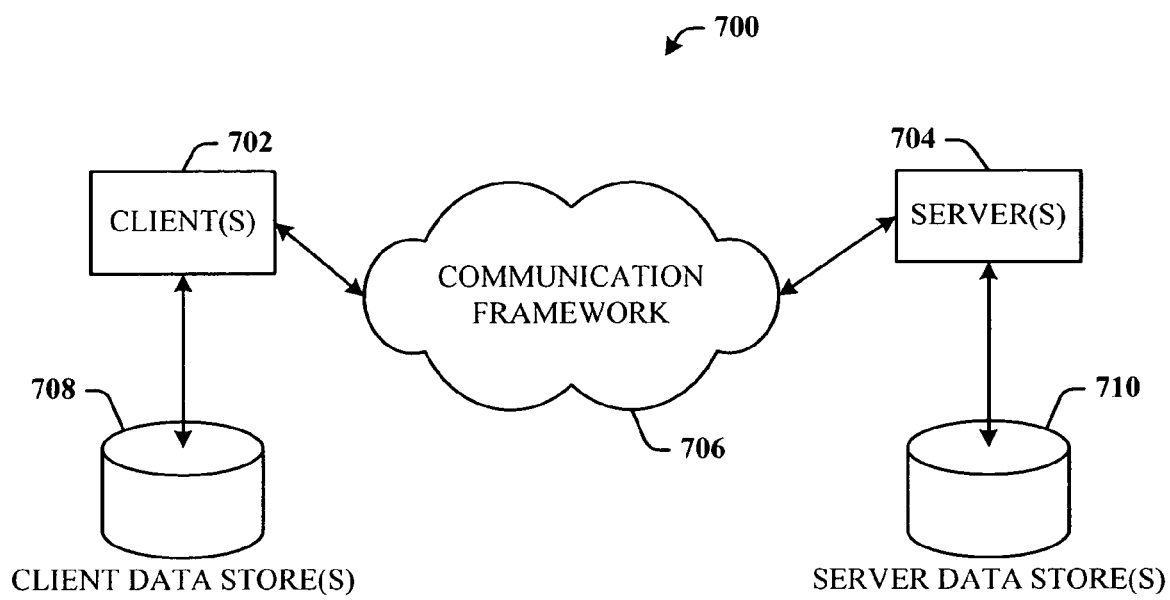
FIG. 7 illustrates a schematic block diagram of an exemplary computing environment in accordance with the present invention.

Referring now to FIG. 7, there is illustrated a schematic block diagram of an exemplary computing environment 700 in accordance with the present invention. The system 700 includes one or more client(s) 702. The client(s) 702 can be hardware and/or software (e.g., threads, processes, computing devices). The client(s) 702 can house cookie(s) and/or associated contextual information by employing the present invention, for example. The system 700 also includes one or more server(s) 704. The server(s) 704 can also be hardware and/or software (e.g., threads, processes, computing devices). The servers 704 can house threads to perform transformations by employing the present invention, for example. One possible communication between a client 702 and a server 704 may be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications may be facilitated via a wired (including optical fiber) and/or wireless technology. The client(s) 702 are operably connected to one or more client data store(s) 708 that can be employed to store information local to the client(s) 702 (e.g., cookie(s) and/or associated contextual information). Similarly, the server(s) 704 are operably connected to one or more server data store(s) 710 that can be employed to store information local to the servers 704.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of integrating an unmanaged application into an IDE (integrated development environment), comprising:
   interfacing the unmanaged application to the IDE with a host adaptor that is specific to the unmanaged application such that the unmanaged application is accessible as a designer within the IDE,
   the host adaptor merging at least one menu of the unmanaged application with at least one menu of the IDE, wherein the merging is performed in response to determining whether the IDE has focus or if the unmanaged application has focus, and by enabling at least one merged menu item and by disabling at least one merged menu item based upon a result of the determination, wherein if it is determined that the integrated development environment has focus then at least one menu item of the unmanaged application will be disabled while enabling at least one menu item of the integrated development environment and wherein if it is determined that the unmanaged application has focus then the at least one integrated development environment menu item will be disabled while enabling the at least one unmanaged application menu item;

the host adaptor providing functionality for modifying at least one native response of the unmanaged application when the unmanaged application is hosted within the IDE; and hosting a document in the IDE such that functionality of the IDE and the unmanaged application can be used to manipulate the document.

2. The method of claim 1, further comprising manipulating the document by at least one of, performing a drag-and-drop operation of a control onto the document;

viewing a data-behind file associated with the document;

writing managed code in the data-behind file;

operating the designer in a design mode and a runtime mode;

presenting non-visual data; or drawing managed objects on the document.

3. The method of claim 1, further comprising providing a special page of preferences for the unmanaged application such that when integrated into the IDE, the unmanaged application behaves according to the preferences.

4. A computer-readable storage medium having computer-executable instructions which, when executed, implement the method recited in claim 1.

5. The method of claim 4, further comprising exposing a code-behind file associated with the document such that contents of the file can be manipulated.

6. The method of claim 4, further comprising exposing a code-behind file associated with each subdocument of the document such that contents of each file can be manipulated.

7. The method of claim 4, further comprising providing a view control that triggers in response to an event.

8. A computer system that facilitates the use of an improved software integrated development environment for developing one or more applications or processes, comprising:

a processor; and a computer readable storage medium storing components of an integrated development environment, the components of the integrated development environment comprising:

a hosting component that interfaces with an unmanaged application that has one or more native functions corresponding to one or more menu item selections and that is hosted within the integrated development environment;

a designer framework that provides user access and interfaces to designer capabilities of the integrated development environment, wherein the hosting component and designer framework interface such that the unmanaged application functions as a designer within the integrated development environment; and a host adaptor that is application specific to the unmanaged application, wherein the host adaptor merges at least one menu of the unmanaged application with at least one menu of the integrated development environment by at least determining which of the integrated development environment or the unmanaged application has focus, and by enabling at least one merged menu item and by disabling at least one other merged menu item of the unmanaged application based upon the determination, wherein if it is determined that the integrated development environment has focus then at least one menu item of the unmanaged application will be disabled while enabling at least one menu item of the integrated development environment and wherein if it is determined that the unmanaged application has focus then the at least one integrated development environment menu item will be disabled while enabling the at least one unmanaged application menu item, and wherein the host adapter further provides functionality for modifying at least one of the one or more native responses of the unmanaged application.

9. The system of claim 8, the hosting component supports an object linking and embedding (OLE) technology.

10. The system of claim 8, the unmanaged application includes at least one of a word processing application or a spreadsheet application.

11. The system of claim 8, further comprising an integration interface to facilitate integrating a third-party unmanaged application as a designer in the integrated development environment.

12. The system of claim 8, further comprising a document-hosting subcomponent that facilitates hosting a document that can be manipulated in the integrated development environment.

13. The system of claim 12, the document can be manipulated using at least one of the unmanaged application or the integrated development environment.

14. The system of claim 12, the document is one of a new document or an existing document.

15. The system of claim 12, facilitates adding a control to the document and editing properties of the control.

16. The system of claim 12, the document contains at least one of embedded and linked objects.

17. The system of claim 12, the designer can handle the document in at least one of a binary format or an Extensible Markup Language (XML) format.

18. The system of claim 12, further comprising manipulating the document by at least one of, performing a drag-and-drop operation of a control onto the document;

viewing a data-behind file associated with the document;

writing managed code in the data-behind file;

operating the designer in a design mode and a runtime mode;

presenting non-visual data; or drawing managed objects on the document.

19. The system of claim 12, further comprising exposing properties and components of the document for manipulation.

20. The system of claim 8 facilitates hosting a plurality of different unmanaged applications.

21. The system of claim 8, further comprising a tray component that facilitates presenting non-visual data in the integrated development environment.

22. The system of claim 8, facilitates the presentation of a properties window that displays properties for code-behind project items.

23. A computer readable medium having stored thereon computer executable instructions for carrying out the system of claim 8.

* * * * *